Jan. 17, 1961  G. R. COULSON  2,968,603
HOT WATER PROCESS FOR THE EXTRACTION OF OIL FROM
BITUMINOUS SANDS AND LIKE OIL BEARING MATERIAL
Filed March 20, 1957
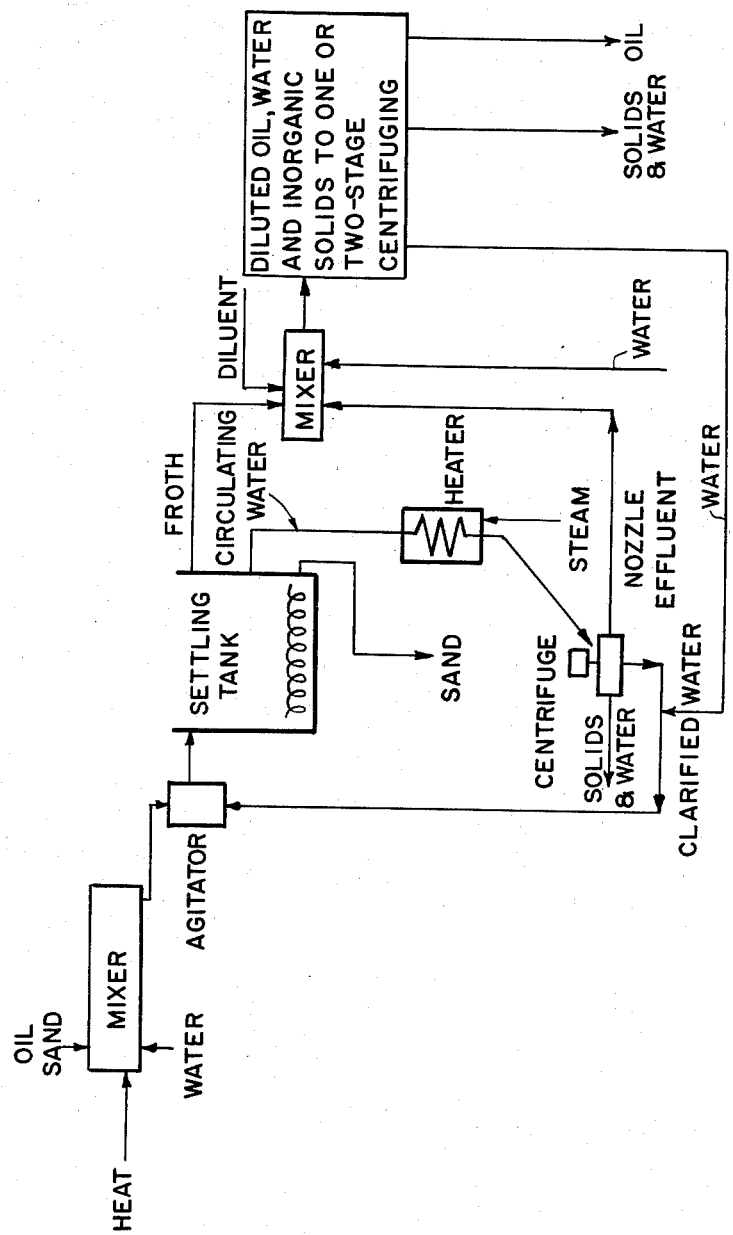
GORDON R. COULSON
Inventor
By
Attorney United States Patent Office 2,968,603
Patented Jan. 17, 1961

2,968,603

HOT WATER PROCESS FOR THE EXTRACTION OF OIL FROM BITUMINOUS SANDS AND LIKE OIL BEARING MATERIAL

Gordon R. Coulson, Calgary, Alberta, Canada, assignor to Can-Amera Oil Sands Development Ltd., Calgary, Alberta, Canada Filed Mar. 20, 1957, Ser. No. 647,384

2 Claims. (Cl. 208—11)

This invention relates to a method of separating oil from bituminous sands and like oil bearing materials, and more specifically relates to an improvement in the "hot water" method of oil sand extraction.

The hot water method has been used in a pilot plant established by the Government of Alberta at Bitumount, and is described, in various embodiments in such Canadian patents as Nos. 448,231 and 488,928.

Generally, the "hot water" process as described in these patents, and in technical literature may be said to comprise the steps of moistening and heating the sands with steam or hot water, mechanically pulping the sands together with a large excess of hot water, and immersing the pulp in a quiescent bath of hot water from which the oil may be floated and removed as a froth, or overflow product.

This froth or overflow product, has been found to contain of the order of from 4 to 8% inorganic solids and 25 to 30% water and further treatment is required to obtain a usable oil. Such further treatment, in at least one installation using the hot water method of which I am aware, has involved introducing the froth or overflow product to a further heated settling tank or thickener. Thickeners are well known in this art and generally comprise a tank having vertical side walls, a conical bottom, and are sometimes provided with a central shaft having upwardly inclined paddles attached thereto which, when rotated at a very slow speed, urge solids towards the centre of the unit and thence downwardly where they are discharged through the restricted cross-sectional area of the cone.

The froth or overflow product is introduced to the settling tank or thickener, and the overflow from the tank, by this time comprising of the order of 5% inorganic solids, and 20 to 30% water is mixed with a diluent, i.e. a hydrocarbon oil capable of dissolving the bitumen and of lowering its specific gravity, and introduced to another heated settling tank, or thickener, where the water content is lowered to about 20%.

The overflow from the second settling tank or thickener is then led into a dehydrator where it is heated to about 400° F. whereupon the water remaining is flashed off as steam.

In the practical operation of this hot water method several serious disadvantages have been encountered.

Firstly, it has been discovered that silt, clay and other fines build up in the water of the quiescent bath. Despite the fact that a certain amount of fines settles with the coarser sands, a considerable proportion of these fines remains in suspension in the water bath. As this proportion of fines builds up, the viscosity and specific gravity of the bath water increase and the froth or overflow product will be found to contain increasing percentages of inorganic solids. This serious problem has been recognized by others, and in at least one application of the hot water process of which I am aware, the water of the quiescent bath has been led from the bath, heated, and passed through one or more settling tanks or thickeners before being recycled into the process. These tanks or thickeners, however, remove only part of the solids, despite a lengthy retention time in each tank, and the water clarification process is, therefore, slow and complicated. Using such methods, moreover, it is impossible to design a system which will operate efficiently throughout the whole range of fines content of the raw oil sands encountered. It will be appreciated that the composition of the raw sands will vary greatly from day to day or even hour to hour as they are removed from their naturally occurring state. It would not be unusual to take two samples from adjacent points, and find the fines content of one to be 3 or 4 times the other. Thus, as an economic matter, a thickener of a specific design or a specified number of thickeners would not efficiently clarify the water of the quiescent bath after treatment of raw sands of these varying compositions. If a unit were designed to handle the minimum fines content encountered, it would be of insufficient capacity to treat adequately a run of the maximum fines content. If, on the other hand, the unit were designed to handle the maximum fines control, the number and size of the thickeners required, and the retention time in each would be so great as to render the treatment uneconomical.

In addition, a certain amount of oil always remains in suspension in the quiescent bath, and if a water clarification stage including thickeners or settling tanks is used, an amount of oil will be lost at each such thickener with the inorganic solid tailings.

In the hot water process outlined, the steps required to treat the froth or overflow product from the quiescent bath to obtain a usable oil is most unsatisfactory. The use of one or more settling tanks with dilution of the oil constituent as an intermediate step between successive settlings or thickenings, coupled with the use of a dehydrator to flash to steam is expensive, time consuming, and inefficient. The method is expensive because of the number of successive tanks employed, time consuming because of the successive stages and retention time required in each, and inefficient because the final product before flashing still contains up to 5% inorganic solids and 20% water, and because a proportion of the oil content is lost at each settling or thickening stage with the clay and silt fines.

In addition, the final flashing of the water at 400° F. results in the distillation of some of the lighter hydrocarbons and these must be recovered from the steam by a complicated and relatively expensive procedure.

Furthermore, in practice, the tailings from each thickener comprise water with clay, and oil in suspension, and are entirely unsuitable for recycling in the process.

It is an object of this invention, therefore, to provide a method whereby the water of the quiescent bath in a hot water process, may be quickly and effectively treated to remove clay, silt and other fine organic solids therefrom.

It is a further object of this invention to provide such a method as will operate efficiently and economically throughout a wide and varying range of fines content of the raw oil sands being processed.

It is another important object of this invention to provide a method whereby the froth or overflow product from the quiescent bath of the hot water process, may be separated into its oil, water and solids constituents more simply, economically, and quickly than has heretofore been the case.

It is a further object of this invention to provide such a method as will permit the water separated to be returned to the process.

These and other advantageous objects will become apparent through a consideration of the following detailed description taken in conjunction with the attached drawing which is a flow sheet of a hot water process operating so as to embody features of this invention.

The invention consists broadly in the clarification of the water of the quiescent bath, and of the separation of the froth or overflow product of the quiescent bath into relatively pure constituents, by the application of centrifugal force rather than by settling tanks or thickeners as has heretofore been the case.

In greater detail, the water of the quiescent bath, in which, as has been pointed out, clay, silt and other fines together with adhering oil will build up in suspensions, may be diverted from the tank, and, with or without the addition of heat, subjected to centrifugal force as by means of a centrifuge.

The centrifuge to be adopted should preferably be of the continuous type wherein the water from the bath may be continuously charged, and the separated constituents, namely, the inorganic solids and adhering oil and the clear water, continuously withdrawn. The nozzle effluent, namely, the inorganic solids and adhering oil, is in the form of any oily sludge which should be diluted by the addition of a diluent and centrifuged to yield a clarified oil substantially free of inorganic solids and water.

The centrifugal force required to be applied will generally be of a relatively high order but will vary with the content of the water being treated. It is a simple matter to regulate the rate per minute of a given machine so that the water overflow from the machine will be found to be satisfactorily solids free.

Similarly, the froth or overflow product from the quiescent bath may be diluted as in the former practice, and then subjected to centrifugal force in a one, two, or more stage operation whereupon a three-way separation may be effected of oil, water and inorganic solids.

It will be appreciated that in its natural state, the oil constituent of Alberta tar sands is very viscous, and has a specific gravity usually about 1.0 but usually substantially below 1.4 (at 77° F.). To effect a clean separation of this oil from the water and solids contained with it according to this invention, it is necessary to reduce the specific gravity substantially below that of water, for reasons which will become apparent hereafter.

Thus, according to this invention, the froth or overflow product from the quiescent bath and oil sludge from plant water are first admixed with a suitable diluent, i.e. a hydrocarbon oil capable of dissolving the oil constituent of the froth or overflow product, and of substantially lowering its specific gravity. While relatively low boiling hydrocarbons such as benzene, xylene, toluene, gasoline, naphtha or the like may be used, it is preferred to use diluents having an initial boiling point of 350–400° F. or higher such as kerosene, furnace distillates or diesel fuels, etc. to prevent substantial losses by evaporation.

The diluent should be thoroughly admixed with the froth or overflow product and oil recovered from plant water to ensure uniform distribution therethrough.

The diluted product is then subjected to the action of centrifugal force.

It is essential, during the process of separation through the application of centrifugal force, that sufficient water be present to form a continuous layer or barrier between the oil constituent and the solids constituent as well as completely saturating the voids in the solids component. I have found that if the solids and oil are allowed to contact each other, they will, in many cases, recombine and require additional centrifuging to reseparate them. If the froth or overflow product contains sufficient water to ensure the maintenance of such a barrier and saturation of sand void space, it may be introduced without further addition, but if the water content is not sufficiently high, it will be necessary to add further water to the diluted product prior to the application of centrifugal force.

Under operating conditions in the centrifuge, a water layer or barrier of at least one inch should be continuously maintained between the oil and the solids. If water is to be added, the lower limit of water addition is the least amount at which the solids removed are virtually oil free, and the oil is virtually solids free. This point may be readily determined when the process is in operation. The only upper limit on the amount of water to be added is determined by the efficiency of the process, for when sufficient water is added to form the water barrier, no additional amount of water will influence the recovery, but a large excess of water would be uneconomical to handle in the centrifuge.

The application of centrifugal force will result in a three-way separation of the constituents by densities, namely, an outer layer of solids, an intermediate layer of water and an inner layer of diluted oil. The oil recovered is of a high grade, substantially water free, virtually solids free and may be further processed in a standard refinery without the necessity for settling, thickeners or evaporators.

The water recovered will be found to be substantially solids free and may be recycled into the process for recovery of the heat content thereof.

The attached drawing is a flow sheet illustrating one possible arrangement of parts whereby the concept of the invention may be adapted to a conventional hot water process both in the clarification of the water of the settling tank and in the treatment of the froth or overflow product from the hot water bath and for the separation of oil therefrom.

In some cases, where the oil contains an unusually high percentage of suspended solids, it may be preferable to apply centrifugal force in a two stage operation. If this is done, best results will generally be achieved if the initial centrifuging is at a relatively low force and the latter at a relatively high force.

For a two stage operation, a lower speed centrifuge, or a cyclone could be used for the initial stage followed by a subsequent centrifuging at higher speeds.

My invention has been described in detail with reference to preferred embodiments. It is to be understood, however, that specific quantities and apparatus are described for the purposes of illustration only, and are not to be construed as limiting the invention.

What I claim as my invention is:

1. A continuous process for separating oil substantially free of water and solids from oil sands, which comprises forming a substantially uniform slurry of an oil-bearing sand with hot water, introducing the slurry into a body of hot water in a quiescent settling zone to form a three layer system, continuously withdrawing a top layer of froth comprising a major proportion of hot undiluted oil and minor but substantial proportions of water and suspended solids, continuously withdrawing an intermediate layer which is principally water but contains a minor proportion of suspended fine solids and oil, and continuously withdrawing and discarding a bottoms layer of water and substantially oil free sand, subjecting the intermediate layer to centrifugal action in a continuous separation zone to produce a stream of oil-free solids in water, a substantially oil- and solids-free water stream and a stream consisting of oil containing some solids and water, discarding the first stream, recycling the second stream to the settling zone, mixing the third stream with the said withdrawn top layer of froth from the settling zone, and with a diluent miscible with said oil, said diluent being substantially nonvaporizable at the processing temperature, the proportions of said diluent being such as to reduce the specific gravity of said oil to about 0.79 to about 0.95, adjusting the amount of water in said mixture to provide a water barrier between the oil layer and the sand layer in a subsequent centrifuging step of at least about one inch, subjecting the diluted mixture to a continuous centrifuging step, recovering an oil product stream substantially free of solids and water, recovering a stream of water substantially free of oil and solids, and removing and discarding a stream of a water slurry of substantially oil-free fine solids.

2. The process of claim 1 wherein the solids-free water from the last mentioned centrifuging step is recycled to said settling zone.

References Cited in the file of this patent

UNITED STATES PATENTS

| | | |
|---|---|---|
| 2,009,366 | Wait | July 23, 1935 |
| 2,316,005 | Lachle | Apr. 6, 1943 |
| 2,524,859 | Van Dongen | Oct. 10, 1950 |

FOREIGN PATENTS

| | | |
|---|---|---|
| 488,928 | Canada | Dec. 16, 1952 |
| 733,892 | Great Britain | July 20, 1955 |

OTHER REFERENCES

National Petroleum News, Sept. 1, 1943, vol. 35, pages R-387 to R-394 (page R-394 relied on).